(12) United States Patent
Young et al.

(10) Patent No.: US 9,606,314 B2
(45) Date of Patent: Mar. 28, 2017

(54) COMPOSITE CABLE ASSEMBLY WITH NEUTRAL BUOYANCY

(71) Applicant: The Penn State Research Foundation, University Park, PA (US)

(72) Inventors: Randy Young, State College, PA (US); Rita Young, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 213 days.

(21) Appl. No.: 14/319,232

(22) Filed: Jun. 30, 2014

(65) Prior Publication Data

US 2015/0016789 A1    Jan. 15, 2015

Related U.S. Application Data

(60) Provisional application No. 61/957,421, filed on Jul. 2, 2013.

(51) Int. Cl.
| | | |
|---|---|---|
| *G02B 6/44* | (2006.01) | |
| *G02B 6/50* | (2006.01) | |
| *H02G 1/10* | (2006.01) | |
| *H02G 9/12* | (2006.01) | |

(52) U.S. Cl.
CPC ........... *G02B 6/4427* (2013.01); *G02B 6/506* (2013.01); *H02G 1/10* (2013.01); *H02G 9/12* (2013.01); *Y10T 428/2933* (2015.01)

(58) Field of Classification Search
CPC .. G02B 6/4415; G02B 6/4427; G02B 6/4432; G02B 6/506; H02G 9/12
See application file for complete search history.

(56) References Cited

U.S. PATENT DOCUMENTS

| | | | |
|---|---|---|---|
| 3,262,275 A | 7/1966 | Perret | |
| 3,568,456 A | 3/1971 | Van Loenen | |
| 3,766,307 A | 10/1973 | Andrews, Jr. | |
| 4,104,886 A | 8/1978 | Dumont et al. | |
| 4,341,440 A | 7/1982 | Trezeguet et al. | |
| 4,399,322 A | 8/1983 | Hafner, Jr. | |
| 4,610,505 A | 9/1986 | Becker et al. | |
| 4,662,712 A | 5/1987 | Tabata et al. | |
| 4,763,981 A | 8/1988 | Wilkins | |
| 5,054,881 A | 10/1991 | Fisher et al. | |
| 5,923,616 A * | 7/1999 | Badger .................. | G01V 1/201 367/154 |
| 6,211,964 B1 | 4/2001 | Luscombe et al. | |
| 6,239,363 B1 * | 5/2001 | Wooters .................... | F16L 1/14 138/110 |

(Continued)

FOREIGN PATENT DOCUMENTS

| | | |
|---|---|---|
| DE | 8629389 U1 | 2/1987 |
| DE | 4006597 | 9/1991 |

OTHER PUBLICATIONS

International Search Report and Written Opinion issued Oct. 14, 2014 for co-pending application No. PCT/US2014044846.

*Primary Examiner* — Daniel Petkovsek
(74) *Attorney, Agent, or Firm* — Dinsmore & Shohl LLP (57) ABSTRACT

An optical fiber cable assembly for use in a fluid environment includes an elongated optical fiber cable having a negative buoyancy. A first supplemental filament has a positive buoyancy and is connected to the elongated optical fiber cable to form a composite cable assembly having a composite buoyancy that is generally neutral.

8 Claims, 5 Drawing Sheets

(56) References Cited

U.S. PATENT DOCUMENTS

| | | | |
|---|---|---|---|
| 6,323,420 B1* | 11/2001 | Head | F16L 7/00 |
| | | | 138/103 |
| 7,822,306 B2 | 10/2010 | Shinoski et al. | |
| 7,993,077 B2 | 8/2011 | Alliot | |
| 8,226,328 B2* | 7/2012 | Thompson | G01V 1/3852 |
| | | | 367/15 |
| 8,369,673 B2 | 2/2013 | Hawkes et al. | |
| 2006/0120675 A1 | 6/2006 | Goldner et al. | |
| 2008/0014812 A1 | 1/2008 | Quigley et al. | |
| 2009/0145613 A1 | 6/2009 | Coronado | |

* cited by examiner

COMPOSITE CABLE ASSEMBLY WITH NEUTRAL BUOYANCY

CROSS-REFERENCE TO RELATED APPLICATIONS

This application claims priority of U.S. Provisional Patent Application Ser. No. 61/957,421 filed Jul. 2, 2013, the contents of which are incorporated herein by reference.

FIELD OF THE INVENTION

The present invention relates generally to elongated elements such as communication cables suspended in a fluid environment.

BACKGROUND OF THE INVENTION

There are a variety of situations in which it is desirable to submerge an elongated element such as a communication cable in a fluid environment, such as the ocean, and for the element to be generally suspended between an upper and lower boundary of that fluid environment. An example of such an application is where a ship needs to communicate to shore or to another location at high data rates and with low latency. Communication systems utilizing satellite links have drawbacks, such as high latency.

One approach is to connect the ship to a communication site using a communication cable, with the cable being suspended in the fluid environment between the ship and the communication site. Fiber optic cables provide for high data rate and low latency communication. However, a "raw" optic fiber has a density greater than water and therefore will sink to the lower boundary of a fluid environment. This may be undesirable. Jacketed cable assemblies have been provided that are constructed so as to have a neutral buoyancy. However, such composite cables typically have high cost and are bulky.

SUMMARY OF THE INVENTION

The present invention provides various embodiments of composite assemblies adapted to provide a functionally neutral buoyancy in a fluid environment. Composite assemblies include an elongated element such as an optical fiber cable and one or more supplemental filaments connected together so as to provide a composite assembly with a functionally neutral buoyancy.

According to an embodiment of the present invention, an optical fiber cable is provided for use in a fluid environment. An elongated optical fiber cable has a negative buoyancy in a fluid environment, and has an outer surface. A first supplemental filament has a positive buoyancy in the fluid environment. The first supplemental filament is connected to the elongated optical fiber cable to form a composite cable assembly having a composite buoyancy. The quantity of the first supplemental filament per unit length of the optical fiber is chosen such that the composite buoyancy in the fluid environment is generally neutral. In certain versions, the first supplemental filament is connected to the elongated optical fiber cable by the first supplemental filament being at least partially coiled around the outer surface of the elongated optical fiber cable. In certain versions, the first supplemental filament has connected portions connected to the optical fiber cable and detached portions not connected to the optical cable fiber such that the detached portions may extend away from the optical fiber cable in the fluid environment. The connected portions may be connected to the elongated fiber cable by the connected portions being at least partially coiled around the outer surface of the elongated optical fiber cable.

In certain versions, the first supplemental filament comprises a plurality of filament segments, each being connected to the optical fiber cable and spaced apart along the length of the elongated optical fiber cable. At least some of the filament segments each have a connected portion connected to the optical fiber cable and a detached portion not connected to the optical fiber cable such that the detached portion may extend away from the optical fiber cable in the fluid environment. The connected portions of the filament segments may be connected to the elongated optical fiber cable by the connected portions being at least partially coiled around the outer surface of the elongated optical fiber cable.

In certain versions the elongated optical fiber cable is selected from a group consisting of raw optical fiber and jacketed cable having at least one optical fiber surrounded by a jacket. In certain versions, the first supplemental filament is selected from a group consisting of thread formed of fibers, solid thread and hollow thread. In some versions, the first supplemental filament has a specific gravity within the range of 0.75 to 0.5 and in some versions the first supplemental filament has a radius that is greater than a diameter of the elongated optical fiber cable. For example, the radius of the first supplemental filament may be greater than the diameter of the optical fiber cable by a factor of 1.5.

In certain versions, the optical fiber cable assemble further includes a second supplemental filament having a negative buoyancy in a fluid environment. The second supplemental filament is connected to the elongated optical fiber cable and forms part of the composite fiber assembly. The quantity of the first and second supplemental filaments per unit length of the optical fiber are chosen such that the composite buoyancy in the fluid environment is generally neutral. The first and second supplemental filaments may be connected to the elongated optical fiber cable by the filaments being at least partially coiled around the outer surface of the elongated optical fiber cable. At least one of the supplemental filaments may have connected portions connected to the optical fiber cable and detached portions not connected to the optical fiber cable such that the detached portions may extend away from the optical fiber cable in the fluid environment. The connected portions may be connected to the elongated optical fiber cable by being at least partially coiled around the outer surface of the cable. At least one of the filaments may comprise a plurality of filament segments each connected to the cable and spaced apart along the length of the cable. At least some of the filament segments may have a connected portion that is connected to the cable and a detached portion not connected to the cable. The connected portions may be connected by coiled around the cable. The first and second supplemental filaments may be selected from a group consisting of thread formed of fibers, solid thread and hollow thread. The first supplemental filament may have a specific gravity within a range between 0.75 and 0.5. The first or second supplemental filament may have a radius that is greater than the diameter of the elongated optical fiber cable, such as having a radius that is greater than the diameter of the cable by a factor of 1.5.

The present invention further provides a communication system for providing a physical communication connection between a communication site and a remote vehicle in a fluid environment having an upper boundary and lower boundary. An optical fiber cable assembly is provided in accordance with any embodiment of the present invention. The optical fiber cable assembly has a first end and a second end, with the first end physically connected to the communication site and the second end physically connected to the remote vehicle. A portion of optical fiber cable assembly extends between the communication site and the remote vehicle through the fluid environment and is suspended in the fluid environment between the upper boundary and lower boundary. The communication site may be a second vehicle.

The present invention further provides an elongated composite assembly adapted for use in the fluid environment having an upper boundary and a lower boundary. The composite assembly includes an elongated element having a first buoyancy in a fluid environment, and having an outer surface. A first elongated supplemental filament has a second buoyancy different from the first buoyancy in the fluid environment. The elongated element and the first elongated supplemental filament are connected along their lengths so as to form a composite assembly with a composite buoyancy selected such that the composite assembly is suspended between the upper boundary and the lower boundary of the fluid environment. The elongated element may be a communication or signal carrying element, such as an optical fiber cable. In some versions, the first supplemental filament is connected to the elongated element by being at least partially coiled around the outer surface of the elongated element.

In certain versions, the first supplemental filament has connected portions connected to the elongated element and detached portions not connected to the element such that the detached portions may extend away from the elongated element in the fluid environment. The connected portions may be connected by being at least partially coiled around the outer surface of the elongated element.

In some versions, the first supplemental filament comprises a plurality of filament segments each being connected to the elongated element and spaced apart along the length of the elongated element. At least some of the filament segments may have a connected portion connected to the elongated element and a detached portion not connected to the elongated element such that the detached portions may extend away from the elongated element in the fluid environment. The connected portions may be connected by being at least partially coiled around the outer surface of the elongated element.

In some versions, the first supplemental filament is selected from the group consisting of thread formed of fibers, solid thread and hollow thread. In some versions, the first supplemental filament has a specific gravity in a range between 0.75 and 0.5 and may have a radius that is greater than a diameter of the elongated element, such as being greater than the diameter by a factor of 1.5.

Certain versions further include a second elongated supplemental filament having a third buoyancy different from the first and second buoyancies in the fluid environment. The second supplemental filament is connected to the elongated element along its length and forms part of the composite assembly having the composite buoyancy. The first and second supplemental filaments may be connected to the elongated element by being at least partially coiled around the outer surface of the elongated element. At least one of the filaments may have connected portions connected to the elongated element and detached portions not connected to the elongated element such that the detached portions may extend away from the elongated element in the fluid environment. The connected portions may be connected by being at least partially coiled around the outer surface of the elongated element.

In some versions, at least one of the filaments compromises a plurality of filament segments each connected to the elongated element and spaced apart along a length of the elongated element. At least some of the filament segments may have a connection portion connected to the elongated element and a detached portion not connected to the elongated element such that the detached portion may extend away from the elongated element in the fluid environment. The connection portions may be connected by being at least partially coiled around the outer surface of the elongated element.

The present invention further provides a method of suspending an optical fiber or other elongated element in a fluid environment. An elongated optical fiber cable is provided, with the cable having a negative buoyancy in a fluid environment. A first supplemental filament having a positive buoyancy is also provided. At least a portion of the first supplemental filament is connected to the optical fiber cable to form a composite assembly having a composite buoyancy. The quantity of the first supplemental filament per unit length of the fiber cable is selected such that the composite buoyancy in the fluid environment is generally neutral. In some versions, the first supplemental filament is connected to the optical fiber cable as the optical fiber cable is disposed into the fluid environment. The connecting step may compromise of connecting the first supplemental filament to the optical fiber cable by at least partially coiling the first supplemental filament around an outer surface of the optical fiber cable as the optical fiber cable is disposed into the fluid environment. The connecting step may compromise at least partially coiling the first supplemental filament around an outer surface of the optical fiber cable as the optical fiber cable is disposed into the fluid environment.

In some versions, the first supplemental filament is connected to the elongated optical fiber cable by being at least partially coiled around the outer surface of the cable. In some versions, the connecting step comprises connecting portions of the first supplemental filament to the optical fiber cable and not connecting other portions to the optical fiber cable such that the portions that are not connected may extend away from the cable in the fluid environment. The connecting step may comprise coiling the connected portions around the outer surface of the cable.

In some versions, the first supplemental filament comprises a plurality of filament segments and the connecting step comprises connecting at least a portion of each of the filament segments to the optical fiber cable, spaced apart along the length of the cable. The connecting step may comprise connecting at least a portion of some of the filament segments to the optical fiber cable and not connecting another portion to the optical fiber cable such that the portions that are not connected extend away from the cable in the fluid environment. The connecting step may comprise coiling the connected portions around the outer surface of the cable.

In some versions, the elongated optical fiber cable is selected from a group consisting of raw optical fiber and jacketed cable having at least one optical fiber surrounded by a jacket. In some versions, the first supplemental filament is selected from a group consisting of thread formed of fibers, solid thread and hollow thread. In some versions, the first supplemental filament has a specific gravity in a range between 0.75 and 0.5. In some versions, the first supplemental filament has a radius that is greater than the diameter of the elongated optical fiber.

In some versions, the method further comprises providing a second supplemental filament having a negative buoyancy in a fluid environment. At least a portion of the second supplemental filament is connected to the optical fiber cable to form the composite cable assembly having the composite buoyancy. The quantity of first supplemental filament and second supplemental filament per unit length of the optical fiber cable is selected such that the composite buoyancy in the fluid environment is generally neutral. In some versions, the first and second supplemental filament is connected to the optical fiber cable as the optical fiber cable is disposed into the fluid environment. The connecting step may comprise connecting the first and second filaments to the cable by at least partially coiling the filaments around an outer surface of the cable as the cable is disposed into the fluid environment.

In some versions, the method further comprises not connecting at least a portion of the first or second supplemental filaments to the cable such that the detached portions may extend away from the cable in the fluid environment. In some versions, the first or second supplemental filament comprises a plurality of filament segments and the connecting step comprises connecting at least a portion of each of the filament segments to the optical fiber cable with the segments spaced apart along the length of the cable. The connecting step may further comprise not connecting at least a portion of at least some of the filament segments to the optical fiber cable such that the detached portions may extend away from the optical fiber cable in the fluid environment.

DETAILED DESCRIPTION OF THE INVENTION

The present invention provides a composite assembly adapted for use in a fluid environment, where an elongated element, such as an optical fiber, having a first buoyancy in a fluid environment and a supplemental filament having second buoyancy different from the first buoyance are connected to one another along their lengths so as to form a composite assembly with a composite buoyancy that is functionally neutral in the fluid environment, allowing the composite assembly to be suspended between an upper and lower boundary of the fluid environment. Such a composite assembly may include an elongated element that is a communication or signal carrying element, such as a raw optical fiber or a jacketed cable having at least one optical fiber surrounded by a jacket. This elongated element, on its own, may have a negative buoyancy in the fluid environment. A supplemental filament, such as a thread, may, on its own, have a positive buoyancy on the fluid environment. The elongated element in the supplemental filament are connected to one another along their lengths, such as by at least partially coiling the supplemental filament around the outer surface of the elongated element. By selecting a quantity of the supplemental filament per unit length of the elongated element, a composite assembly may be formed that is generally neutrally buoyant in the fluid environment.

As will be clear to those of skill in the art, the buoyancy of an element depends on the fluid environment. For example, salt water in the ocean is significantly denser than fresh water. The buoyancy of an element will depend both on its density as compared to the fluid environment and the amount of air that may be entrapped by an element. An element or assembly may be referred to herein as generally neutrally buoyant or functionally neutrally buoyant when that element or assembly may be suspended in the fluid environment between an upper and lower boundary of the fluid environment and the element or assembly will remain between the upper and lower boundaries for more than a trivial period of time. An assembly may be considered to be suspended between the upper and lower boundaries even where a disconnected portion of a supplemental filament extends to the upper or lower boundary. As known to those of skill in the art, the density of water, such a sea water, varies depending on location, depth, and other factors, and may change over time at a given location.

Figure 1:
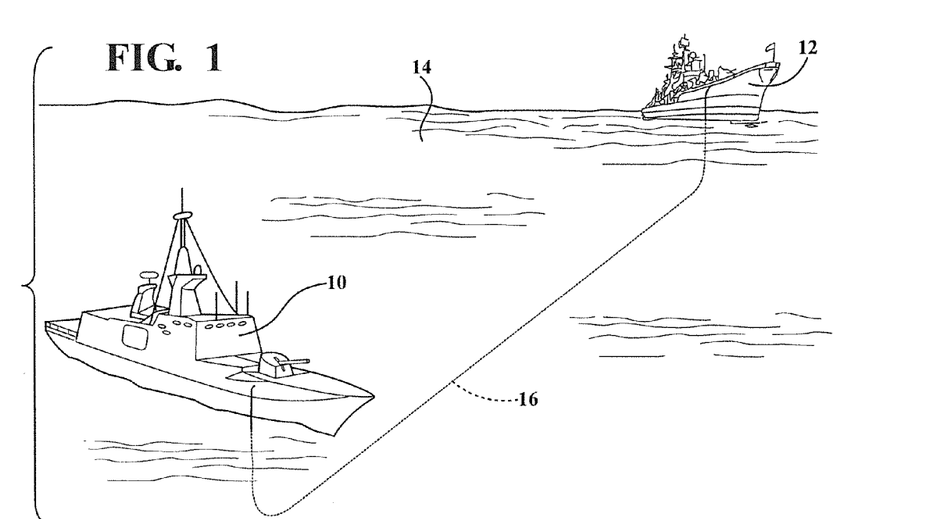
FIG. 1 is a perspective view of a pair of ships with a cable assembly in accordance with the present invention connecting the ships for communication purposes.

Referring now to FIG. 1, a first ship 10 and second ship 12 are shown on a body of water 14, representing a fluid environment. A composite communication assembly 16 is shown extending between the ships 10 and 12 and disposed below the surface of the fluid environment 14. This represents an exemplary application for an elongated composite assembly of the present invention as well as an embodiment of the present invention. Additional applications include communication between a ship and shore or communication between any two points separated by a fluid environment. A portion of the composite assembly may be stored on one of the ships and paid out or collected as necessary to establish and maintain communication. For example, the position of the ships or other points may change relative to each other, especially when a ship is under way.

Figure 2:
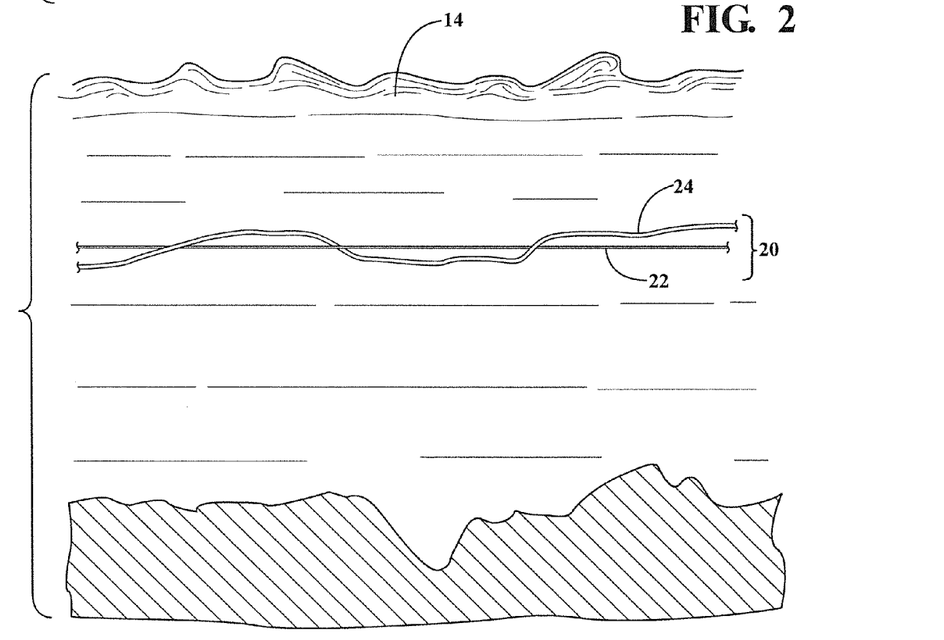
FIG. 2 is a view of an embodiment of an optical fiber cable assembly in accordance with an embodiment of the present invention.

FIG. 2 illustrates a first embodiment of the present invention wherein a composite cable assembly 20 is formed by interconnecting an elongated element 22 with an elongated supplemental filament 24. In the illustrated embodiment, the filament 24 is loosely coiled around the elongated element 22. In one example, the element 22 is an optical fiber having a negative buoyancy in the fluid environment 14. The supplemental filament 24 may be any elongated element with a positive buoyancy such that the combination of the optical fiber 22 and filament 24 create a composite assembly with a composite buoyancy that is generally neutral in the fluid environment 14.

Figure 3:
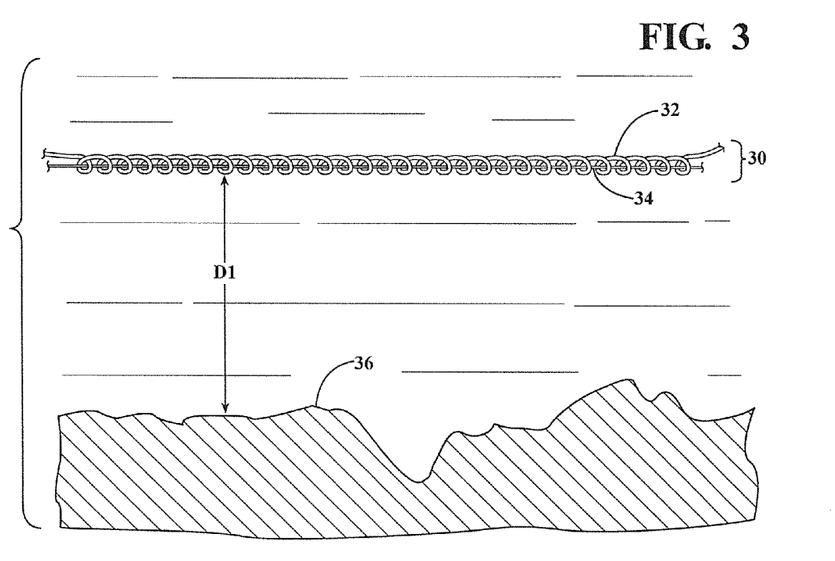
FIG. 3 is a view of another composite cable assembly in accordance with an embodiment of the present invention.

FIG. 3 illustrates a second embodiment of the present invention in which a composite assembly 30 includes an elongated element 32 and a supplemental filament 34. As shown, the supplemental filament 34 is coiled around the elongated element 32 with significantly more coils per unit length than in FIG. 2. As will be clear to those with skill in the art, the number of coils of filament per unit length of elongated element will depend on the relevant buoyancies of the element and filament as well as other factors. The assembly 30 is shown suspended in the fluid environment at a distance D1 above a lower boundary 36 of the fluid environment. While FIGS. 2 and 3 illustrate the elongated element and supplemental filament being interconnected by coiling the supplemental filament around the elongated element, numerous other approaches to connection may be used. For example, the elongated element may be partially coiled around the filament, the filament and elongated element may be glued together or the element and filament may be attached using connectors of any type, such as clips.

Figure 4:
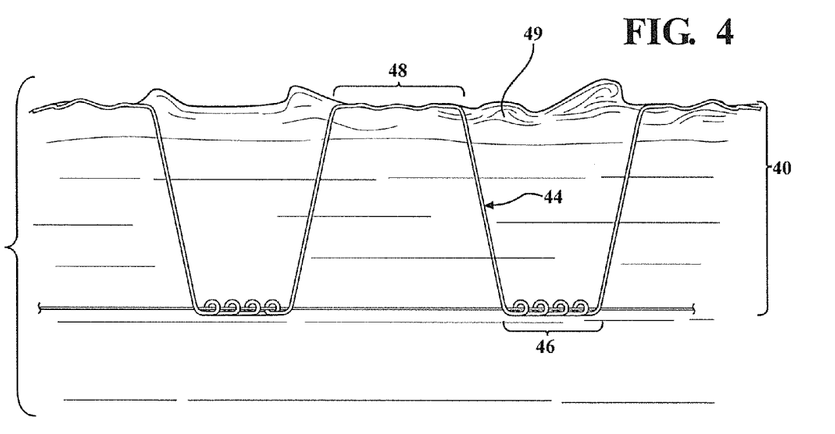
FIG. 4 is a view of another composite cable assembly in accordance with an embodiment of the present invention.

Referring now to FIG. 4, a third embodiment of the present invention is shown. Again, the composite assembly 40 includes an elongated element 42 and a supplemental filament 44. However, this embodiment differs in that the supplemental filament 44 includes connected portions 46 that are connected to the elongated element 42 and detached portions 48 that are not connected to the elongated element 42 such that the detached portions 48 may extend away from the elongated element 42 when in the fluid environment. In the illustrated embodiment, the filament 44 is continuous such that the connected portions 46 and detached portions 48 are part of the same elongated element. In the illustrated embodiment, part of the detached portion 48 extends to upper boundary 49 of the fluid environment and floats thereon. This may be referred to as a floating portion, and is a part of the detached portion. A transition portion extends between the floating portion and the connected portion 46 by extending downwardly in the fluid environment to the elongated element 42. Together, the floating portion and the transition portion make up the detached portion 48. The composite assembly 40 may be referred to as an assembly with self-compensating buoyancy. As will be clear to those with skill in the art, if the combined buoyancy of the elongated element 42 and the submerged portions of the filament 44 are positive, the elongated element 42 will rise towards the surface. This will allow an additional length of filament 44 to become part of the floating portion, thereby reducing the amount of filament 44 that is submerged and reducing the composite buoyancy of the submerged portions of the composite assembly 40. If the combined buoyancy of the elongated element 42 and the submerged portions of the filament 44 is negative, the elongated element 42 will sink, causing additional filament 44 to be submerged. Put another way, the total amount of filament making up the floating portion and the transition portion will stay the same, but some of the floating portion will become transition portion or vice versa. This will continue until such time as the composite buoyancy of the elongated element and the submerged portions of the filament reach neutral or positive buoyancy with respect to the surrounding fluid environment, at which point the elongated element 42 will stabilize or rise. As will be clear who are skilled in the art, by selecting the relative buoyancy of the elongated element 42 and filament 44, and the amount of filament 44 that is detached, the approximate distance below the surface may be chosen.

Figures 5, 6:
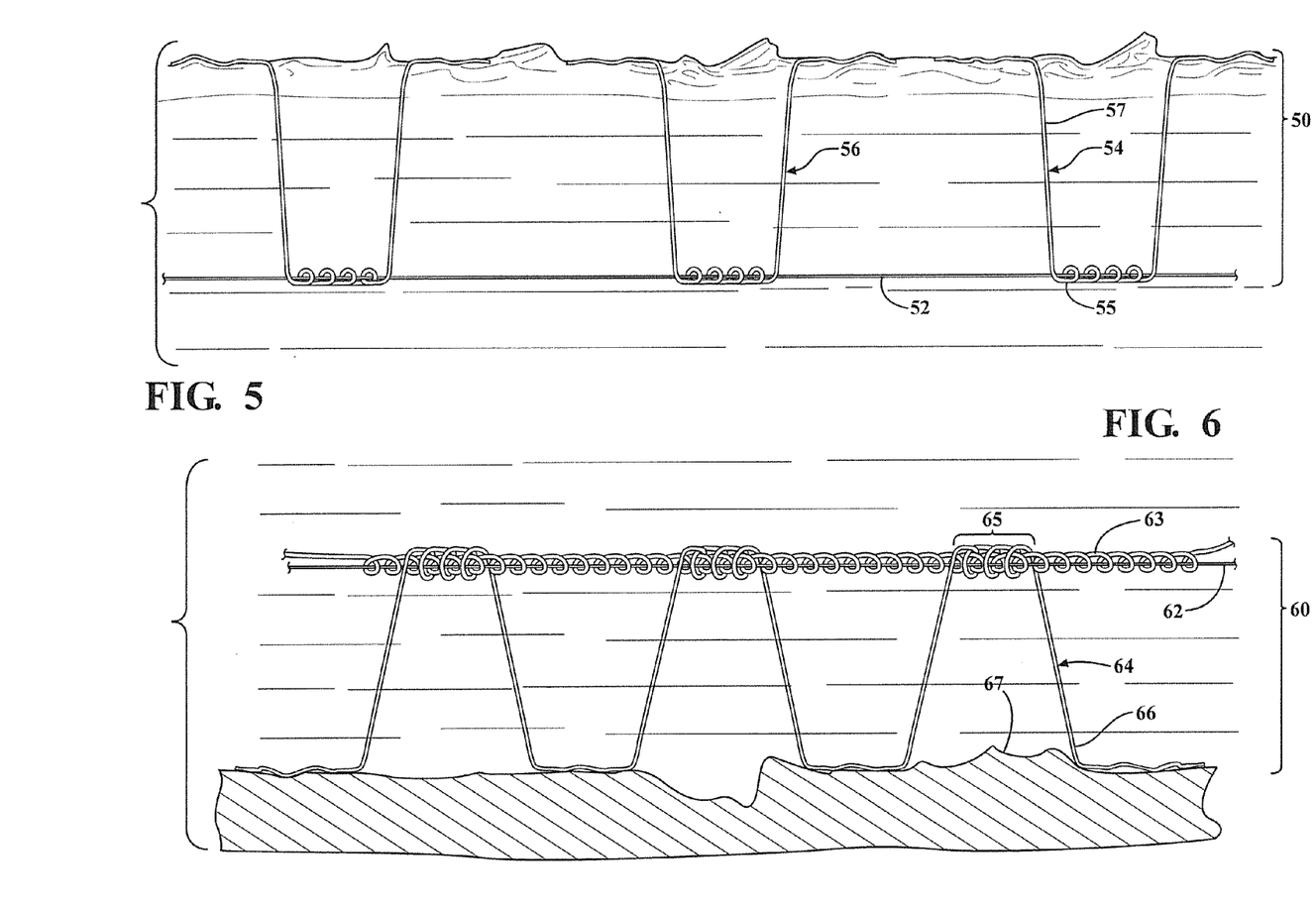
FIG. 5 is a view of a further composite cable assembly in accordance with an embodiment of present invention.
FIG. 6 is a view of another composite cable assembly in accordance with an embodiment of present invention.

FIG. 5 shows a fourth embodiment of the present invention. This embodiment differs from the third embodiment in that the supplemental filament takes the form of filament segments 54 and 56 that are spaced apart along the length of the elongated element 52. Each filament segment has a connected portion 55 that is connected to the elongated element 52, such as by being coiled around the element 52, and a disconnected portion 57 that may extend away from the elongated element 52 when in the fluid environment. The connected portion 55 and disconnected portion 57 are continuous with each other. As with the third embodiment, part of the disconnected portion extends to the upper surface of the fluid environment and floats thereon. Again, the distance at which the elongated element 52 is disposed below the surface may be selected by choosing the buoyancies of the component parts, the spacing between the segments 54 and 56, the quantity of filament per unit length of elongated element 52, and the amount of filament that is disconnected. It should also be noted that the amount of filament that may be disconnected may change over time, if the filament partially uncoils.

According to a further aspect of the present invention, the composite assembly may include more than one supplemental filament. For example, a first supplemental filament may have a positive buoyancy while a second supplemental filament has negative buoyancy. Alternatively, both supplemental filaments may have a positive buoyancy or both may have a negative buoyancy. As one example, an optical fiber, having a negative buoyancy in a fluid environment, may have a first supplemental filament connected thereto with the first supplemental filament having a positive buoyancy. The quantity of filament per unit length of optical fiber may be chosen such so that the combination has a buoyancy close to neutral buoyancy in the fluid environment. A second supplemental filament may be connected to the elongated element so as to fine tune the overall buoyancy. For example, if the combination of the elongated element and first supplemental filament is slightly negative, the second filament may add enough buoyancy so as to provide an overall neutral buoyancy. Alternatively, if the elongated element and first supplemental filament have a combined slightly positive buoyancy, the second filament may have a negative buoyancy such that the overall assembly has a neutral buoyancy.

FIG. 6 illustrates a fifth embodiment of the present invention. A composite assembly 60 includes an elongated element 62, such as an optical fiber, a first supplemental filament 63 that is connected to the elongated element 62 by being coiled thereabout, and a second supplemental filament 64 that has connected portions 65 connected to the elongated element 62 and detached portions 66 that are not connected and can therefore extend away from the elongated element 62 in the fluid environment. In the illustrated embodiment, the second supplemental filament 64 has a negative buoyancy such that the detached portion 66 extend downwardly to a lower boundary 67 on the fluid environment. The composite assembly 60 functions similarly to the embodiment of FIGS. 4 and 5, in that the elongated element 62 will rise or fall until the effective buoyancy of the overall assembly stabilizes. The part of the second supplemental filament that is disposed on the lower boundary 67 of the fluid environment may be referred to as a supported portion and the part that extends from the lower boundary to the elongated element as a transition portion.

Figure 7:
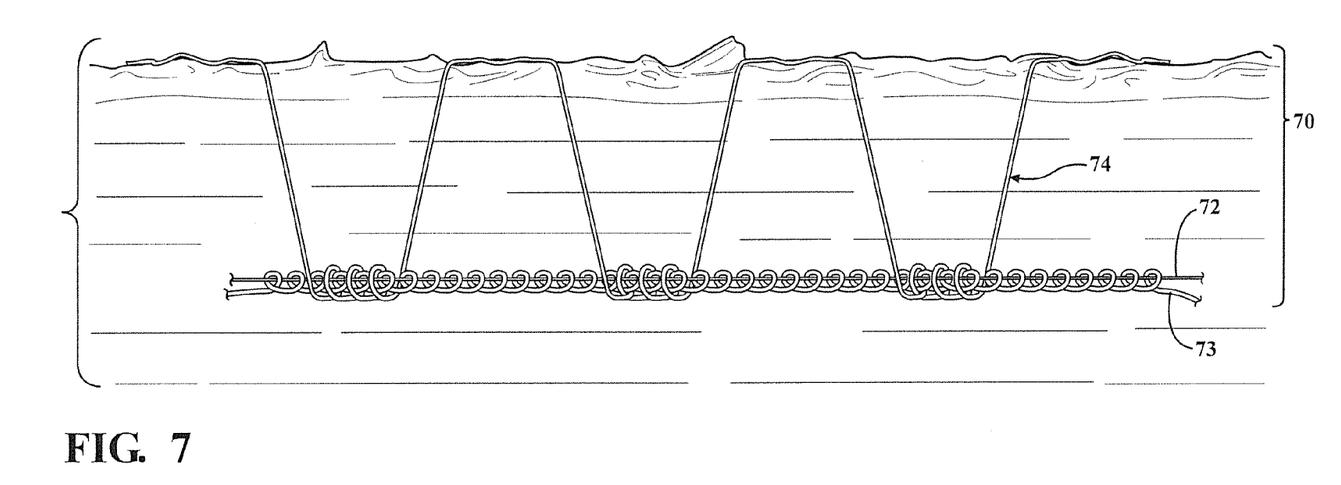
FIG. 7 is a view of a further composite cable assembly in accordance with the present invention.

FIG. 7 shows a sixth embodiment of the present invention. A composite assembly 70 includes an elongated element 72, a first supplemental filament 73, and a second supplemental filament 74. This embodiment differs from the embodiment in FIG. 6 in that the combination of the elongated element 72 and first supplemental filament 73 is negative while the supplemental filament 74 has a positive buoyancy and has disconnected portions that extend upwardly to the upper boundary of the fluid environment.

Figure 8:
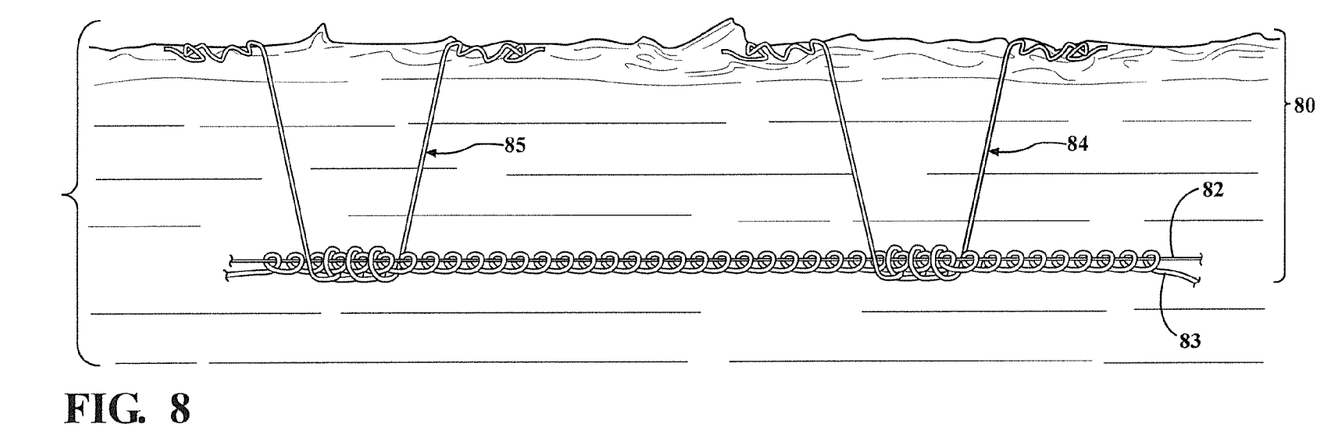
FIG. 8 is a view of yet another composite cable assembly in accordance with an embodiment of the present invention.

FIG. 8 illustrates the seventh embodiment of a composite assembly 80 including an elongated element 82, a first supplemental filament 83, and a second supplemental filament that takes the form of filament segments 84 and 85.

Figure 9:
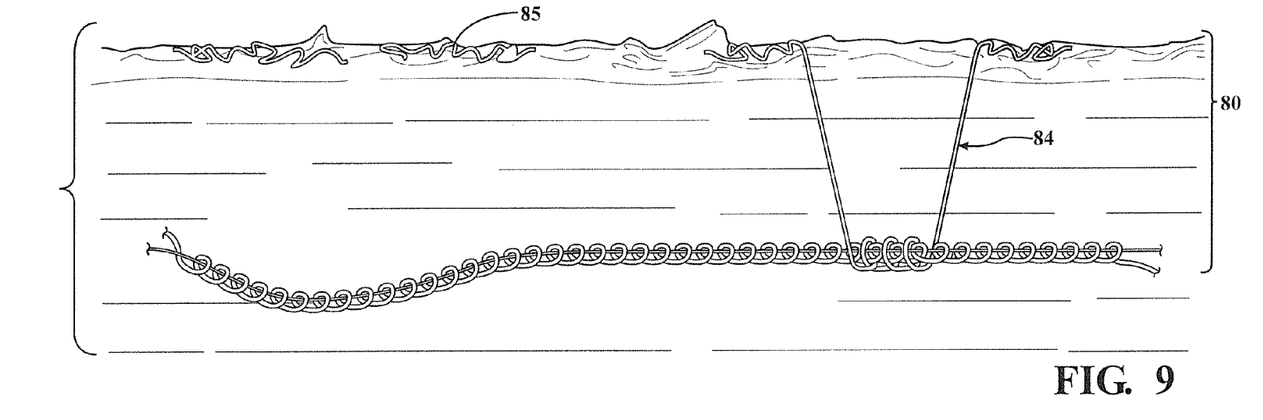
FIG. 9 is a view of a composite cable assembly in which a supplemental filament has become detached.

FIG. 9 illustrates an exemplary operation of the embodiment of FIG. 8 in which the filament in segment 85 has become detached from the remainder of the assembly 80. As shown, part of the composite assembly will then sink downwardly. However, adjacent segments, as such as 84, will compensate allowing the overall composite assembly 80 to continue to function. In a further version of the invention, a supplemental filament may be provided with disconnected portions extending upwardly (positively buoyant) and another supplemental filament may be provided with disconnected portions extending downwardly (negatively buoyant).

A composite assembly in accordance with the present invention may take a variety of forms. In some embodiments, the elongated element is a communication or signal carrying element such as an optical fiber cable. However, the present invention also contemplates other types of elongated elements wherein functionally neutral buoyancy is desirable. Examples include other types of elongated communication carrying elements such as wires and cables.

In embodiments of the present invention wherein the elongated element is an optical fiber cable, this optical fiber cable may be either a "raw" fiber or a jacketed cable having at least one optical fiber surrounded by the jacket. The use of raw fiber is advantageous for some embodiments in that this fiber is less expensive and bulky than jacketed or other types of cables. As known to those with skill in the art, optical fiber typically consists of a core and a cladding with the interface between the core and cladding providing a reflective barrier for containing the optical signal. In some types of optical fiber, the core and cladding are both formed of glass. A coating or jacket may be provided over the cladding to provide some protection. As used herein, a "raw" optical fiber may mean an optical core, an optical core with cladding, or an optical core, cladding and jacket wherein the jacket is applied directly to the cladding.

Figure 10:
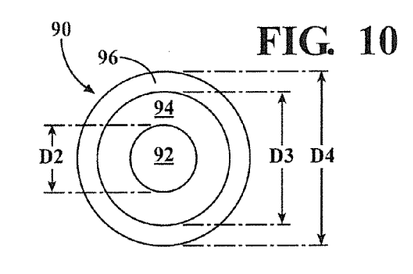
FIG. 10 is a cross-sectional view of an exemplary raw optical fiber.

FIG. 10 illustrates a cross-sectional view of an exemplary raw optical fiber 90. The optical fiber 90 includes a core 92 surrounded by a cladding 94 which is covered with a coating or jacket 96. The relative dimensions of the components in FIG. 10 may not be representative of some optical fibers. Some raw optical fibers use an acrylate polymer or polyimide coating. One type of raw optical fiber that may be used with the present invention is Corning FMF-28. This is a glass optical fiber having a core, a cladding and a coating. The core 92 may have a diameter D2 of 8.2 microns, the cladding 94 may have a diameter D3 of 125 microns and the coating 96 may have a diameter D4 of 242 microns. Such a raw optical fiber may have a density approximately twice that of water, making it negatively buoyant.

In the description above, a "jacketed cable" was discussed, as one example of an elongated element for use with the present invention. As used herein, such a jacketed cable means a cable with at least one raw optical fiber, such as in FIG. 10, contained within a larger jacket. A jacketed cable may also be other types of cable having an outer jacket, such as communication cable. This larger jacket should not be confused with the coating 96 provided directly on the cladding of the raw optical fiber. This larger jacket forming the outer surface of the jacketed cable will typically include more than one raw optical fiber as well as additional elements such as for strengthening of the overall assembly. Such a jacketed cable may have a positive, neutral, or negative buoyancy, with the buoyancy being adjusted in accordance with the embodiments of the present invention. It is also noted that the embodiments of the present invention discussed herein do not have a jacket enclosing the supplemental filaments with the elongated element. Instead, the supplemental filaments are outside the elongated element and exposed to the surrounding fluid environment.

Figure 11:
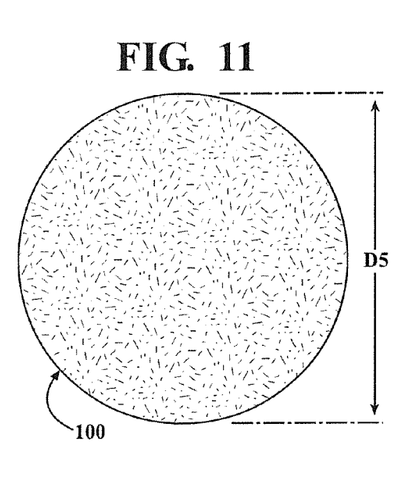
FIG. 11 is a cross-sectional view of an exemplary supplemental filament for use with the present invention.
Figure 12:
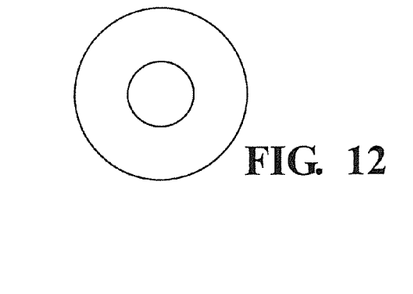
FIG. 12 is a cross-sectional view of an alternative supplemental filament for use with the present invention.
Figure 13:
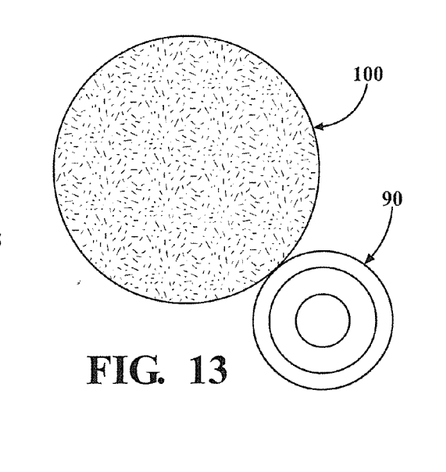
FIG. 13 is a cross-sectional view of an optical fiber with a supplemental filament disposed adjacent the outer surface of the optical fiber.

A supplemental filament used with the present invention may have a positive or negative buoyancy, depending on the buoyancy of the elongated element being supported in a fluid environment and whether the supplemental filament is a first or second supplemental filament. In one example, the supplemental filament is a positively buoyant thread. One example is a polypropylene thread formed of a plurality of tightly wound finer fibers. Such a thread is shown at 100 in FIG. 11. Examples include threads with a thread weight of 46, 69 or 96, though others may be used. In some versions, the density (specific gravity) of the polypropylene itself is approximately 0.9. However, a polypropylene thread formed of finer fibers traps air very tightly such that the composite density (specific gravity) of the polypropylene thread may approach 0.5 for mass produced thread. The material itself may have other densities and other composite densities, with the present invention not being limited to any specific densities. In some embodiments, the diameter D5 of the thread 100 is greater than the diameter D4 of the raw optical fiber. As one example, the diameter D5 is approximately three times the diameter D4. Other diameters may also be used, partially depending on the quantity of supplemental filament used per unit length of the raw optical fiber. Alternatively, a solid thread may be used. As a further alternative, a hollow thread may be used, such as shown at 102 in FIG. 12. A low density polyethylene (LDPE) thread may be used as a positive buoyancy element. Fishing line, such as formed of high density polyethylene (HDPE) may be used as a negative buoyancy element. It should be noted that the filament or filament segments used in embodiments of the present invention is preferably of consistent diameter and material along its length. The present invention is not limited to any specific filament diameter. FIG. 13 illustrates a cross-sectional view of a raw optical fiber 90 connected to a thread 100.

As discussed above, the present invention allows an elongated element to be suspended between an upper and lower boundary of a fluid environment. It should be understood that an elongated element, as this term is used herein, means an element that is very long, such as extending for multiple miles between a ship and a communication site. Such an elongated element may have a width, thickness or diameter that is very small relative to its overall length. Preferably the elongated element has a consistent diameter and construction along its length. An elongated filament for use with the present invention also has a width, thickness or diameter that is very small relative to its overall length. While the elongated element and filament are both illustrated as having a circular cross-section, other cross-sectional shapes may also be used.

Referring again to FIG. 1, the composite communication assembly 16 is shown disposed in the fluid environment and extending between the ships 10 and 12. Obviously, the assembly 16 at some point must be disposed into the fluid environment and extended from one ship to another point.

This may be accomplished in a variety of ways. In one approach, the assembly is pre-assembled with the supplemental filament or filaments attached to the elongated element. This pre-assembled assembly may be stored such as on a spool and then dispensed into the fluid environment. In another approach, the elongated element and the supplemental filament or filaments are stored separately and assembled into the composite assembly as the component elements are dispensed. As another approach, an elongated element and a first supplemental filament are pre-assembled and a second supplemental filament is connected thereto as the assembly is dispensed. By assembling the composite assembly at the time of use, the amount of supplemental filament or filaments per unit length of the elongated element may be adjusted for the actual conditions. Supplemental filaments or filament segments may also be added after the composite assembly is in the fluid environment, to adjust performance. The illustrated embodiments show one or two supplemental filaments, but additional supplemental filaments may be used. Also, more than one type of filament segment may be used, such that some have different buoyancies than others.

As will be clear to those with skill in the art, the herein illustrated and described embodiments of the present invention may be altered in various ways without departing from the scope or teaching of the present invention. It is the following claims, including all equivalents, which define the scope of the present invention.

The invention claimed is:

1. An elongated composite assembly adapted for use in a water environment having an upper boundary and a lower boundary, the composite assembly comprising:
   an elongated optical fiber cable having a first buoyancy in a water environment, the elongated optical fiber cable having an outer surface;
   a first elongated supplemental filament having a second buoyancy different from the first buoyancy in the water environment;
   a second elongated supplemental filament having a third buoyancy different from the first and second buoyancies in the water environment;
   the elongated optical fiber cable and the first and the second elongated supplemental filament being connected along their lengths so as to form a composite assembly with a composite buoyancy selected such that the composite assembly is suspended between the upper boundary and the lower boundary of the water environment;
   wherein at least one of the first elongated supplemental filament or second supplemental filament is connected to the elongated optical fiber by being at least partially coiled around the outer surface of the elongated optical fiber cable; and
   wherein at least one of the first elongated supplemental filament or second elongated supplemental filament has connected portions connected to the elongated optical fiber cable and detached portions not connected to the elongated optical fiber cable such that the detached portions may extend away from the elongated optical fiber cable in the water environment.

2. An elongated composite assembly in accordance with claim 1, wherein at least one of the first elongated supplemental filament or second elongated supplemental filament comprises a plurality of filament segments each being connected to the elongated optical fiber cable, the filament segments being spaced apart along a length of the elongated optical fiber cable.

3. An elongated composite assembly in accordance with claim 2, wherein at least some of the plurality of filament segments each have a connected portion connected to the elongated optical fiber cable and a detached portion not connected to the elongated optical fiber cable such that the detached portion may extend away from the elongated optical fiber cable in the water environment.

4. An elongated composite assembly in accordance with claim 2, wherein the first buoyancy is a negative buoyancy in the water environment.

5. An elongated composite assembly in accordance with claim 4, wherein the elongated optical fiber cable is selected from a group consisting of raw optical fiber and jacketed cable having at least one optical fiber surrounded by a jacket.

6. A communication system that provides a physical communication connection with a communication site and a remote vehicle adapted to travel in a water environment having an upper boundary and a lower boundary, the communication system comprising:
   an elongated composite assembly in accordance with claim 2, the elongated composite assembly having a first end and a second end, the first end physically connected to the communication site and the second end physically connected to the remote vehicle;
   a portion of the elongated composite assembly extending between the communication site and the remote vehicle through the water environment and being suspended in the water environment between the upper boundary and the lower boundary.

7. An elongated composite assembly in accordance with claim 1, wherein both the first elongated supplemental filament and the second elongated supplemental filament are connected to the elongated optical fiber cable by being at least partially coiled around the outer surface of the elongated optical fiber cable.

8. An elongated composite assembly in accordance with claim 1, wherein the first elongated supplemental filament is selected from a group consisting of thread formed of fibers, solid thread and hollow thread.

* * * * *